INVENTOR.
Thomas O. Mehan
BY Thomas S. Ross
Attorney.

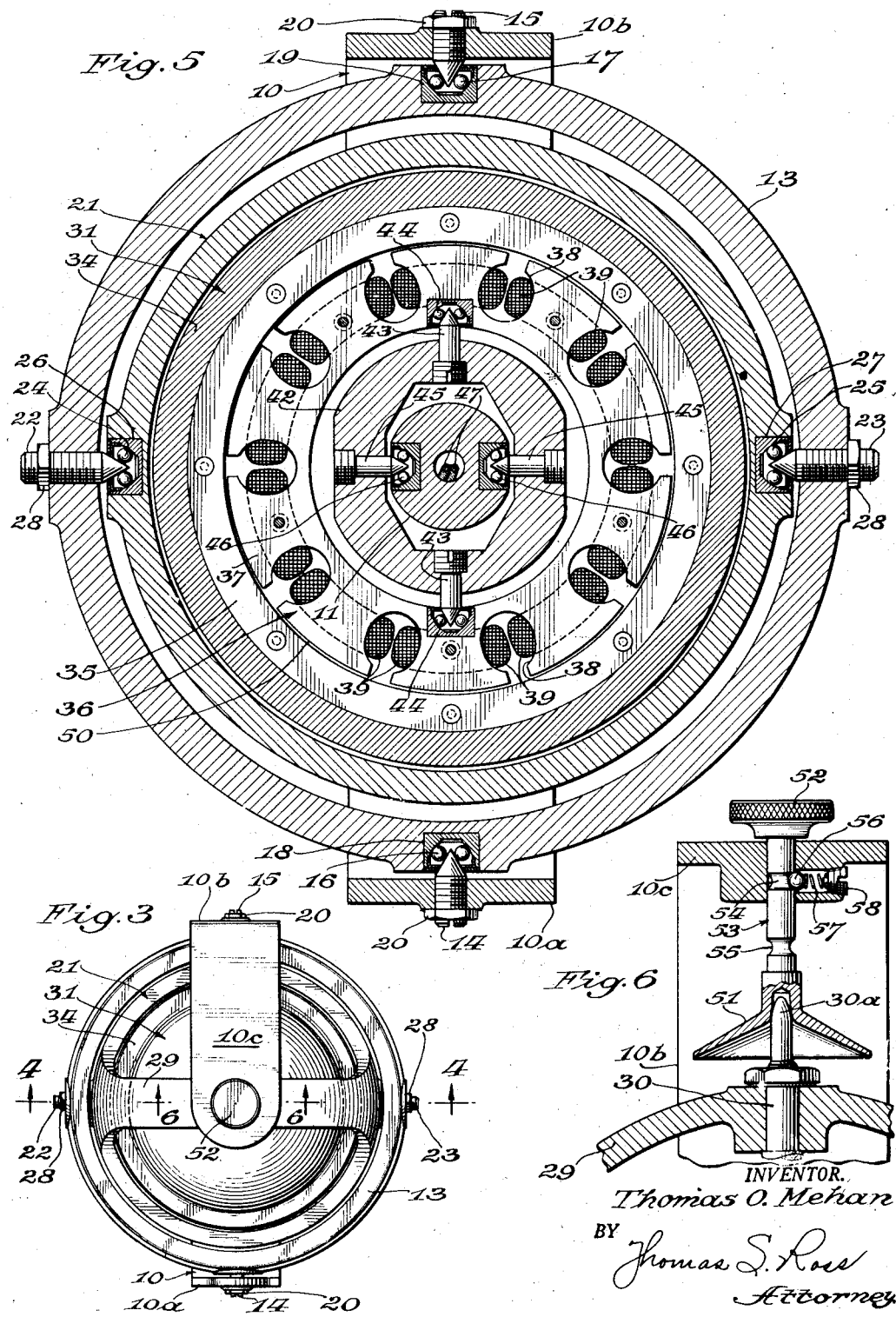

Patented June 19, 1945

2,378,858

UNITED STATES PATENT OFFICE 2,378,858

GYRO-VERTICAL

Thomas O. Mehan, Park Ridge, Ill., assignor to Victor Adding Machine Co., Chicago, Ill., a corporation of Illinois Application June 11, 1943, Serial No. 490,432

11 Claims. (Cl. 74—5)

My invention relates to gyroscopic artificial horizons, or gyro-verticals for maintaining a horizontal reference plane on rapidly moving vehicles, such as aircraft or ships, and more particularly to that type of gyro-vertical which is suspended in gimbal rings with substantially neutral equilibrium.

It is a well known fact among those skilled in the art of gyroscopic devices, that the spin axis of a free gyroscope has the ever present tendency to creep or precess from its normal vertical position due to friction in the bearings thereof, or by stresses set up through acceleration or deceleration forces produced when there is a sudden increase or decrease in the speed of the vehicle on which the gyroscope is mounted, and/or by the earth's movement.

Heretofore, numerous devices have been suggested and manufactured for returning the spin axis of a gyroscope back to its normal vertical position after it has been caused to precess therefrom through the above-mentioned forces. For instance, it has been common practice to employ air under pressure for erecting or positioning gyroscopes, the air being suitably directed for flow through jets and controlled by the use of pendulous shutters or other gravitationally controlled means normally closing the jets and moving to open the same in response to tilting or departure of the gyroscope from its normal vertical position.

The use of air for erecting purposes, however, has certain very definite drawbacks when used in conjunction with electrically driven gyroscopes, since a supply of air under pressure is not available unless an air impellor is put on the gyro. Then, too, due to friction of the shutter pivots, the pneumatic type of erecting or positioning means very often fails to respond to minute changes of tilt, and therefore, is not as sensitive as might be desired. From this it follows that air erecting means for gyro-verticals is not the complete or entirely satisfactory solution to the problem of automatic erection for the spin axis of gyroscopes.

According to my invention I propose to provide very simple means which will not only prevent tilting or precession of the spin axis of gyro-verticals during normal straight flight operations, but which will quickly act to return said spin axis back to its normal vertical position after it has been caused to precess therefrom due to flight of the aircraft in a curved path. To achieve these results I propose to use an electric driven gyro-vertical, and preferably one driven by an alternating current or induction motor. The use of such a motor enables me to utilize an electromagnetic couple having an inherent tendency to overcome the ever present precessional forces which act upon the spin axis of free gyroscopes.

Still further and more limitedly, it is a purpose of the present invention to provide novel and improved means for electrically driving a gyro rotor from a pendulous stator so that the electric magnetic couple created between the stator and rotor normally exerts a stabilizing influence upon the spin axis of said rotor in sufficient magnitude to prevent tilting of such axis during normal flight conditions.

A still further object of the invention resides in the novel stator construction which includes a gravitationally responsive means, such as a weighted pendulum, for normally maintaining the stator in horizontal position, and which automatically acts through the influence of gravity to return the stator to such normal horizontal position should it be tilted by acceleration or deceleration forces produced during an increase or decrease in the speed of the aircraft upon which it is mounted, as for instance during climbing, diving, banking, rolling or other maneuvers through which the aircraft may be put.

The foregoing objects and others hereinafter appearing are attained in the embodiment of the invention illustrated in the accompanying drawings wherein:

Fig. 3 is a plan view of Fig. 1.

Fig. 5 is a horizontal sectional elevation through the gyro-vertical, the section being taken along the line 5—5 of Fig. 1 and perpendicular to the spin axis of the gyro rotor, and, Fig. 6 is an enlarged fragmentary vertical sectional elevation of the caging means employed, the section being taken along the line 6—6 of Fig. 3.

Figure 4:
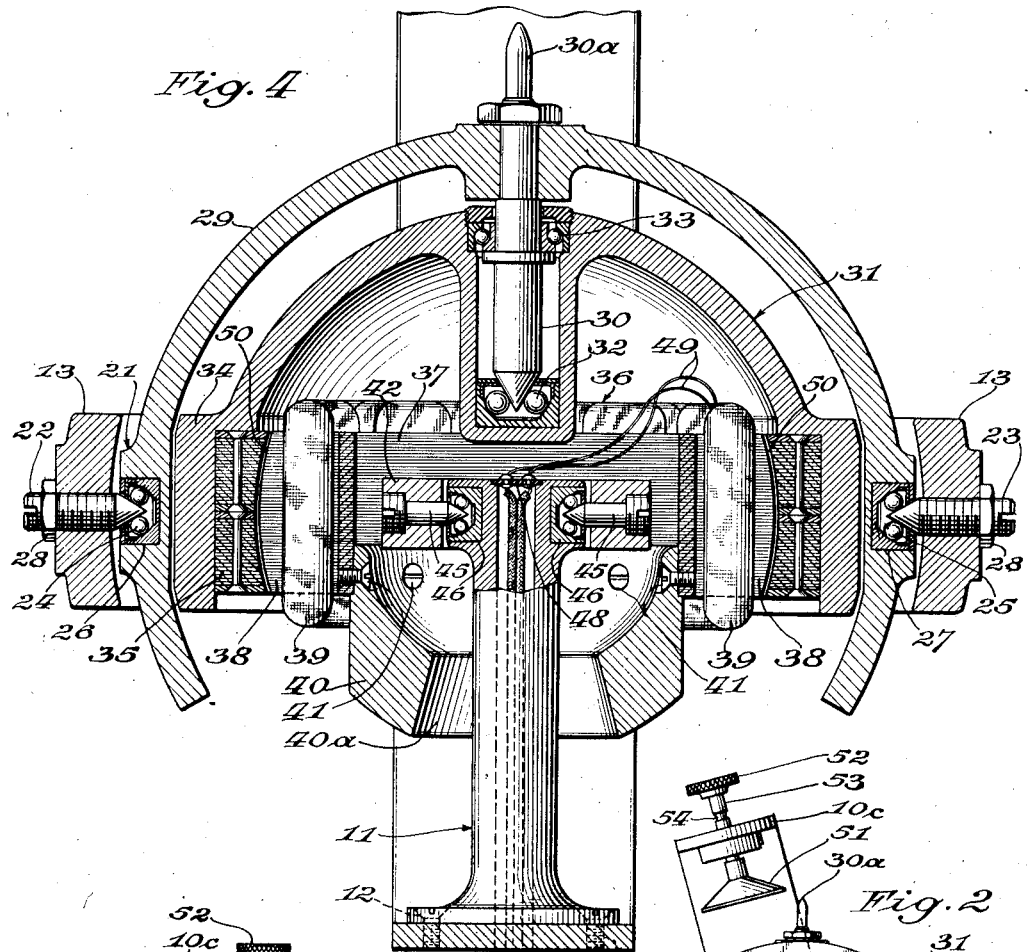
Fig. 4 is an enlarged vertical section partly in elevation, the section being taken on a plane corresponding to the line 4—4 of Fig. 3 looking in the direction indicated by the arrows.
Figure 1:
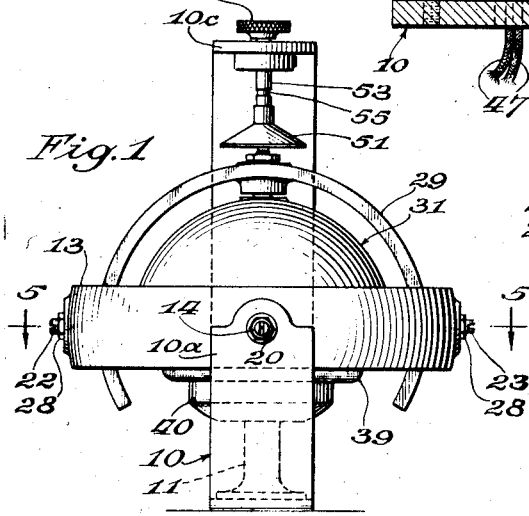
Fig. 1 is a side elevation of a caged gyro-vertical constructed in accordance with my invention.
Figure 2:
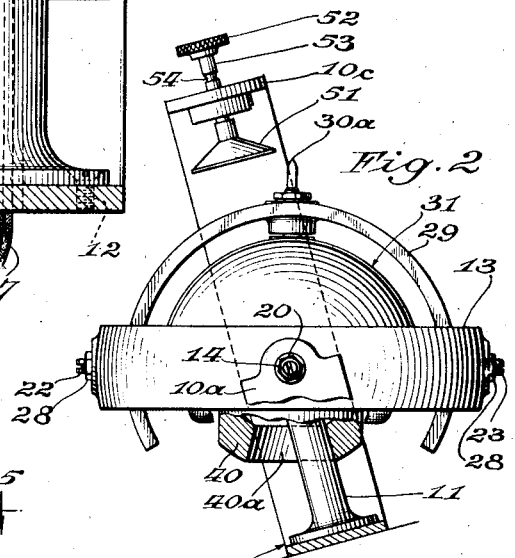
Fig. 2 is a similar view partly in section and uncaged to show the gyro main frame in the position it will assume relative to the gyro in the case of a turn or a bank of the aircraft.

The particular gyro-vertical selected for illustration purposes is shown supported by a substantially rectangular main frame 10 but it is to be expressly understood that such frame may assume the form of a casing or housing to enclose the gyro and prevent entrance of foreign matter such as dust, moisture, etc. In use, the frame or housing 10 is rigidly attached to the aircraft (or ship) in any conventional manner and a vertically disposed hollow post 11 is rigidly fixed thereto by screws 12 for reasons presently disclosed.

An outer gimbal ring 13 (Fig. 5) is shown as pivotly supported by the vertical branches 10a and 10b of frame 10 in a manner to rock about the horizontal axis formed by the pins 14—15, and balls 16—17, of anti-friction bearings 18—19 respectively. The pins 14—15 are externally threaded so as to be received by threaded holes in the branches 10a and 10b respectively, and their tapered or pointed ends engage the balls 16—17 thus providing a combined radial and thrust bearing sometimes termed a "cup bearing."

The bearings 18—19 are desirably pressed into sockets in the outer gimbal ring 13 as clearly shown in Fig. 5, and the threaded pins 14—15 may be finely adjusted relative to the balls 16—17 of said bearings, and locked in adjusted position for example by the lock nuts 20.

The reference numeral 21 designates an inner gimbal ring which is pivotly supported by the outer gimbal ring 13 about an axis at right angles to the pivotal axis of said outer gimbal. The pivotal axis for the inner gimbal 21 is formed by externally threaded pins 22—23, the ends of which are pointed or tapered in a manner similar to pins 14—15 to engage the balls 24—25 of anti-friction bearings 26—27. The pins 22—23 are carried by the outer gimbal 13 and may be finely adjusted relative to the balls 24—25 respectively, and locked in the desired adjusted position by lock nuts 28. Bearings 26—27 are likewise desirably pressed into sockets in the inner gimbal 21, as clearly illustrated in Fig. 5.

From the description thus far it will be apparent that the outer gimbal ring 13 is mounted to rock on a horizontal axis which is perpendicular or at right angles to the horizontal axis about which the inner gimbal ring 21 rocks.

Referring now particularly to Figs. 3 and 4 it will be noted that the inner gimbal ring 21 has a semi-circular strap portion 29 formed integral therewith which serves to rigidly support a vertically depending spindle or rotor shaft 30 for the gyro rotor 31. It will be noted that this shaft serves as the spin axis for the rotor 31. Rotors for gyro-verticals are usually made of heavy metal, such as brass or steel, and in accordance with the present invention the rotor 31 carries anti-friction bearings 32—33 and has an enlarged weighted portion 34 acting as a fly wheel mass. A plurality of laminations or stampings 35, preferably pressed or shrunk into the fly wheel mass 34 of the rotor 31, serve as a rotating squirrel cage for the stator 36.

In the embodiment shown, the stator 36 desirably comprises a plurality of metal stampings 37 (as best shown in Figs. 4 and 5) having slots 38 within which field coils 39 are wound. To return the stator to its normal horizontal position after it has been moved therefrom I employ a weighted pendulum 40 attached thereto by screws 41. As clearly shown in the drawings, the pendulum has a centrally disposed tapered opening 40a therein through which the hollow post 11 passes. The stator 36 is mounted for universal movement with respect to post 11 by a small gimbal ring 42 having outwardly projecting pins 43—43. The pointed ends of said pins engage with anti-friction bearings 44—44, the latter being pressed into sockets formed in the stator laminations. Gimbal ring 42 further carries inwardly projecting pins 45—45 the pointed ends of which engage the anti-friction bearings 46—46 respectively, such bearings being pressed into sockets formed in the enlarged upper end of the hollow post 11 as best shown in Fig. 4.

A working current is supplied to the field coils 39 through conductors 47 which pass upwardly through the hollow post 11, and their upper ends are soldered, or otherwise fastened, to an insulating disk 48 which is pressed into a recess in the upper end of said post. Conductors 47 are in turn, electrically connected with the field coils 39 by extremely flexible leads 49 (Fig. 4) which are sometimes referred to as "cats' whiskers."

The construction of the stator and rotating squirrel cage is such that an arcuate air gap 50 is defined between the concave edge surfaces of the squirrel cage laminations 35, and the convex edge surfaces of the stator laminations 37, as clearly illustrated in Fig. 4.

It will be evident from the foregoing description that rotor 31 has a normally vertical spin axis and that through its suspension in gimbals 13 and 21, respectively, it is supported for oscillation about two mutually perpendicular axes namely: the axis formed by the pins 14—15 and the axis formed by the pins 22—23.

In gyro-verticals, it is generally desirable to have some form of caging mechanism whereby the gyro rotor can be rigidly held when desired. One form of caging mechanism which may be conveniently used in connection with my improved gyro-vertical is shown in Fig. 6, wherein the upper end of spindle 30 terminates in a pointed pin 30a. This pin is held or caged, by a cup 51 when the hand knob 52 is moved to its lowered position shown in Fig. 6. The cup 51 and knob 52 are rigidly fixed to opposite ends of shaft 53, the latter being slidably mounted in the horizontal branch 10c of the frame 10. This shaft has annular grooves 54—55 to receive the detent ball 56, which is yieldably held within one or the other of said grooves by spring 57 depending upon whether the hand knob 52 is in its lowered or elevated position. The spring 57 is held against the detent ball 56 by a threaded plug 58 as shown.

Thus, it will be understood that when the hand knob 52 is depressed, cup 51 will engage and hold the pin 30a relative to the base 10c of the frame 10, at which time the detent ball 56 will engage the groove 54 in shaft 53. To uncage the gyro it is merely necessary to pull upwardly on the hand knob 52 to remove the cup 51 from holding engagement with the pin 30a. The knob and cup will then be held in such elevated position by the detent ball 56 engaging the groove 55.

It has been previously mentioned that one of the principal objects of my invention is to provide a gyro-vertical, the construction of which is extremely simple and of such design that tilting or precession of the rotor spin axis is prevented during normal straight flight operation of the aircraft on which the gyro-vertical is mounted, and which will also quickly act to restore said spin axis of said rotor back to its true vertical position should it be caused to move or precess therefrom by unfavorable torques caused by fraction set up in the bearings, flight in a curved path and/or by the earth's movement.

To describe the operation of my improved gyro-vertical let us assume that the aircraft upon which it is mounted is being flown substantially level or parallel to the earth's surface, and that the rotor is caged but rotating at its maximum speed. Under the above assumed conditions, should the rotor be uncaged, the spin axis thereof would remain at its true vertical position providing no unfavorable torques are applied to the rotor, such as friction in the bearings and/or movement of the earth. However, it is well known that these two unfavorable torques are always present and acting upon free gyroscopes to cause precession of the rotor spin axis. During straight flight operations of the aircraft these two precessional torques are overcome in my improved gyro-vertical by the gravitationally responsive means, namely, the pendulum 40 affixed to the stator 36. In other words, gravity acting upon the weighted pendulum holds the stator 36 horizontal relative to the earth's surface and the electro-magnetic couple between the convex edge surfaces of the stator laminations and the concave edge surfaces of the squirrel cage laminations is of such magnitude that it overcomes the above-mentioned precessional forces tending to precess the rotor spin axis. Thus, it will be seen that during straight flight operation of the aircraft the spin axis of the gyro-rotor will be prevented from precessing due to stabilization of the stator by the pendulous weight and electro-magnetic couple between the stator and rotor.

Let it be assumed now that the aircraft is maneuvered so as to execute a left bank, or flight in a curved path so to speak for a short interval of time and then brought back to substantially level flight. During such maneuver, centrifugal force will act upon the pendulous weight 40 which in turn effects momentary disalignment of the stator relative to the rotor. Providing the interval of time during which the plane is flown in curved flight is of short duration, very little precessional torque will be imparted to the rotor through the electro-magnetic couple between the rotor and stator, but should the curved flight be continued for a long period of time the electro-magnetic couple will gradually act to cause the spin axis of the rotor to precess in proportion to the time of such curved flight. However, when level flight is again resumed, gravity will act on the pendulum 40 to return the stator back to level position and the electro-magnetic couple between said stator and rotor will then become effective to return the spin axis of the rotor to its true vertical position which is attained when the laminations of the rotor are brought into registry or parallel alignment with the laminations of the stator.

To those skilled in the art of gyroscopic devices it will be understood that the spin axis of my gyro rotor will be caused to precess from its normal vertical position whenever the plane is flown in a continuous curved path or circle for an indefinite period of time. This is brought about or caused by centrifugal force acting upon the stator pendulum whereupon the stator is moved out of alignment with the rotor. It is customary however to cage the rotor during prolonged curved flight operations of the aircraft and to uncage it only when the plane is to be flown in substantially level flight.

While I have shown and described a particular embodiment of my invention it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim:

1. In a gyro-vertical the combination of, a universally mounted gyroscope rotor having a normally vertical spin axis, a pendulous stator, and electric means for exerting an erecting torque on said rotor to prevent precession of its spin axis from normal vertical position, said electric means including an electromagnetic couple between said rotor and pendulous stator.

2. In a gyro-vertical for aircraft and the like, the combination of a gyroscope comprising a rotor mounted for universal movement and having a normally vertical spin axis, a pendulous stator universally mounted independently of said rotor, and electric means constantly acting to prevent precession of said rotor spin axis when the aircraft is flown in substantially straight flight and at constant velocity, said last-named means comprising an electromagnetic couple between said rotor and pendulous stator.

3. In a gyro-vertical for aircraft, the combination of a high speed rotor suspended by a pair of gimbal rings so as to have universal movement and a normally vertical spin axis, a stator universally mounted upon a third gimbal ring and entirely independent of said rotor, means carried by the aircraft to pivotally support said last named gimbal ring, and an electromagnetic couple between said rotor and stator constantly acting to prevent precessional movement of said spin axis when the aircraft is flown substantially level and at constant velocity.

4. In a gyro-vertical, the combination of a rotor supported by a pair of gimbals so as to have a normally vertical spin axis, a stator universally mounted independently of said rotor, stampings for the stator, field coils wound upon said stampings, a working current for said coils, a squirrel cage carried by said rotor including a plurality of laminations, and gravitationally responsive means carried by the stator and acting to normally maintain the latter in horizontal position relative to said rotor.

5. In a gyro-vertical for aircraft having a pair of gimbal rings mounted for freedom about mutually perpendicular and normally horizontal axes, a gyro rotor suspended from one of said rings and arranged to spin about a normally vertical axis, means mounted upon the aircraft and arranged to pivotally support the outer of said rings, an induction motor comprising a rotating squirrel cage carried by the rotor, a stator arranged with respect to the squirrel cage so as to define an arcuate air gap between said stator and squirrel cage, field coils for the stator, electrical conductors connecting said coils with a working current, means for universally mounting said stator relative to said aircraft, gravitationally responsive means carried by the stator, and an electric couple created within said arcuate air gap during energization of said field coils, which is effective to restore the spin axis of the rotor to normal vertical position should it be precessed therefrom.

6. In combination, a gyro-vertical comprising a gyro rotor, means supporting said rotor for freedom about mutually perpendicular and normally horizontal axes in substantially neutral equilibrium, said rotor having a normally vertical spin axis, electrical means for rotating said rotor including a stator, means for universally supporting said stator, and means for making said stator pendulous, thereby to apply a constant erecting torque on the rotor by the electro-magnetic couple created between the stator and rotor.

7. In combination, a gyro-vertical comprising a gyro rotor, means supporting said rotor for freedom about mutually perpendicular and normally horizontal axes in substantially neutral equilibrium including a frame and a pair of gimbals, said rotor having a normally vertical spin axis, electrical means for rotating said rotor including a stator, means for universally supporting said stator relative to said rotor and entirely independent therefrom, and a pendulous weight for said stator whereby a constant erecting torque is applied to the rotor through the electro-magnetic couple created between the stator and rotor.

8. In a gyro-vertical, the combination of a gyro rotor having a normally vertical spin axis, a housing, a pair of gimbal rings mounted in said housing to support said rotor for precessional movement about two mutually perpendicular horizontal axes and in substantially neutral equilibrium, a spindle fixed to one of said gimbal rings and serving as the spin axis for said rotor, electric means for rotating said rotor including an induction motor having a pendulous stator universally mounted upon said housing and entirely independent of said rotor, field coils wound upon said stator, a working current for said coils, and a squirrel cage carried by the fly wheel mass of said rotor, characterized by the fact that when said working current is connected with said coils, rotation of said rotor takes place and the magnetic couple created between the stator and rotor exerts a constant erecting torque upon said rotor to prevent departure of its spin axis.

9. In a gyro-vertical for aircraft comprising a universally supported gyroscope rotor mounted to spin about a normally vertical axis, a universally supported stator, means to prevent tilting or precession of the rotor spin axis from its normal vertical position during straight flight operation of said aircraft performed at constant velocity and to return said spin axis back to its true vertical position should it be precessed therefrom through curved flight of said aircraft, said last-mentioned means comprising an electro-magnetic couple between said rotor and stator and gravitationally controlled means on said stator.

10. A gryro-vertical comprising the combination of a gyro rotor supported by gimbals in substantially neutral equilibrium and with its spin axis normally vertical, a pendulous stator also supported by gimbals in substantially neutral equilibrium and entirely independent from the rotor, and electric means adapted to exert an erecting torque upon said rotor to prevent precession of its spin axis from normal vertical position, said erecting means comprising an electro-magnetic couple between the rotor and pendulous stator.

11. In a gyro-vertical for aircraft and the like the combination of a gyroscope comprising a rotor universally mounted within a pair of gimbals to have a normally vertical spin axis, a stator universally mounted independently of said rotor, stampings for the stator, field coils wound upon said stampings, electric conductors for supplying a working current to said coils, a squirrel cage carried by said rotor including a plurality of laminations, gravitationally responsive means carried by the stator to normally maintain the latter in horizontal position and an electro-magnetic couple created within an arcuate air gap defined between the stator stampings and the rotor laminations when said working current is supplied to said stator field coils to thereby prevent precession of the normally vertical spin axis of the rotor when the aircraft is flown substantially level and at constant velocity.

THOMAS O. MEHAN.